(No Model.)
R. H. HERDER.
VINEGAR GENERATOR AND FILTER.
No. 406,905. Patented July 16, 1889.
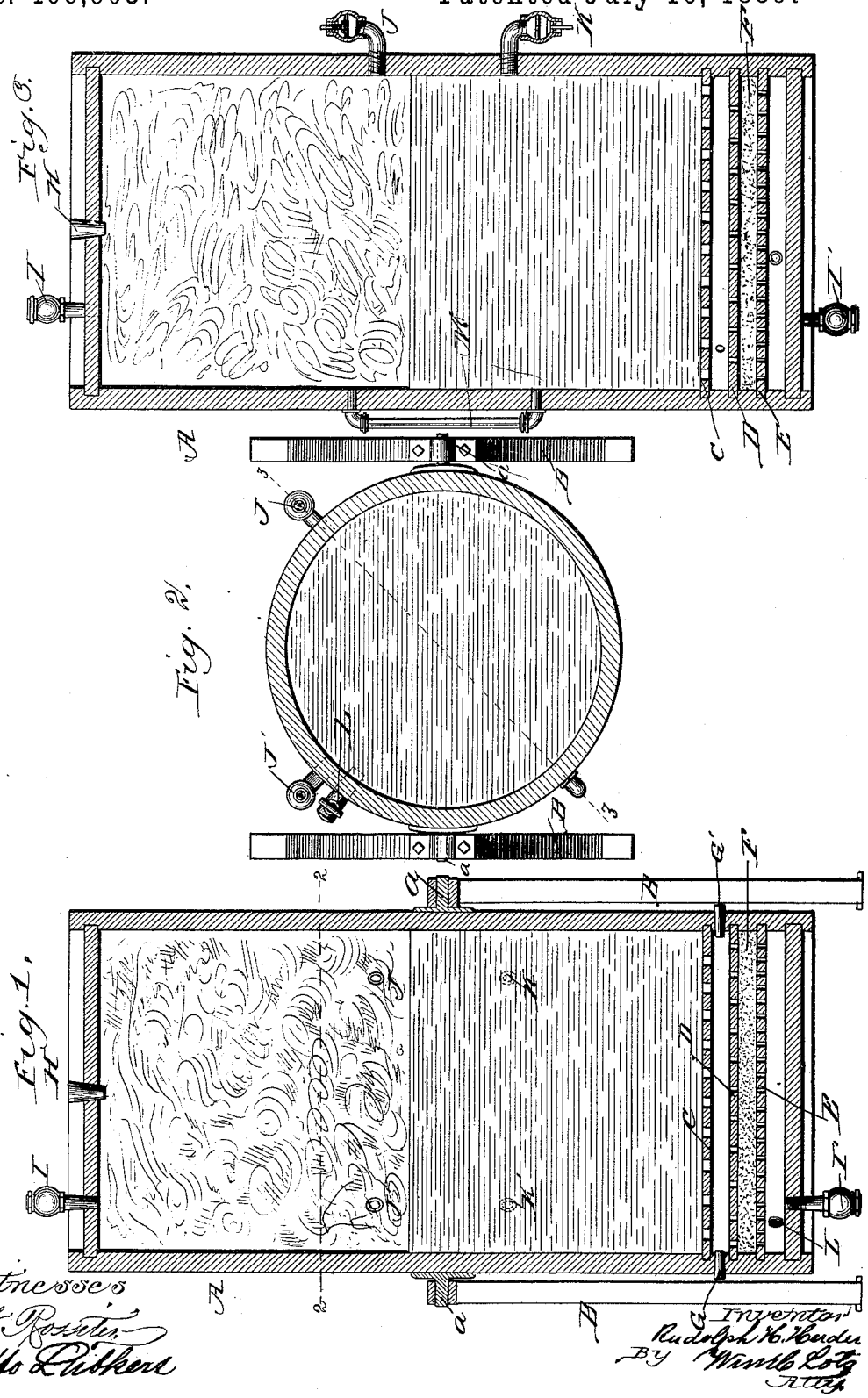

UNITED STATES PATENT OFFICE.

RUDOLPH H. HERDER, OF CHICAGO, ILLINOIS.

VINEGAR GENERATOR AND FILTER.

SPECIFICATION forming part of Letters Patent No. 406,905, dated July 16, 1889.

Application filed December 21, 1888. Serial No. 294,342. (No model.)

*To all whom it may concern:*

Be it known that I, RUDOLPH H. HERDER, a citizen of the United States of America, residing at Chicago, in the county of Cook and State of Illinois, have invented certain new and useful Improvements in Vinegar Generators and Filters, of which the following is a specification, reference being had therein to the accompanying drawings.

My invention relates to a novel apparatus for manufacturing vinegar, and has for its object the more speedy acetification of the mash employed, and at the same time the clarification and filtering of the product; and with these objects in view my invention consists of the novel devices and combinations of devices hereinafter described and specifically claimed.

In the accompanying drawings, Figure 1 represents a longitudinal vertical section, Fig. 2 a sectional plan on line 2 2 in Fig. 1, and Fig. 3 a vertical section on line 3 3 in Fig. 2, of the apparatus.

Corresponding letters of reference in the several figures of the drawings designate like parts.

A denotes the cask, being barrel-shaped and provided with diametrically-opposite trunnions $a$ in its center for supporting same in standard-bearings B, to balance and swing therein. This cask, near one end, is provided with three perforated diaphragms C, D, and E, the space between the diaphragms D and E being filled with filtering material F—such as charcoal, gravel, and sand—and at diametrically-opposite position the cask is tapped between the diaphragms C and D, and these bung-holes are closed with stoppers G and G'. The upper head of the cask is also provided with a bung-hole closed with a stopper H, and both heads of the cask are tapped for connecting check-valves I and I'. Similar check-valves J J' and K K', having elbow-nozzles, are tapped into the sides of the cask close above and below the line of the trunnions $a$, and all of these check-valves, being provided with gravitating valves, will close, when turned, to be below the line of the trunnions, and will automatically open with swinging the cask for the check-valves to occupy a position above the line of the trunnions, all in a manner that, whichever check-valves I and J J' or I' and K K' will be on the side and end of the cask that is turned to be up, will allow a circulation of atmospheric air, while the check-valves then below will be hermetically closed by their own gravity.

Into the space between diaphragm E and the bottom of cask A is tapped into the side of the cask a faucet L, and to the middle of the cask is attached a glass tube M for indicating the quantity of the mash contained in the cask. This cask between diaphragm C and the upper head is filled with wooden shavings. This cask being filled with suitable fermented or distilled mash through bung-hole H to a line slightly above the vertical center of the cask, a certain amount of the mash will adhere to the shavings and will rapidly acidify by being subjected to the action of the current of atmospheric air admitted through check-valves J, J', and I. After a short period—say four hours—the cask A is turned upside down, whereby the check-valves I J J' will close and the valves I' K K' will open, when the current of air admitted through these valves will acidify again, the mash adhering to the shavings previously submerged in the mash. After the mash has been converted into vinegar in the manner above described, by repeated reversals of the position of the receptacle, the receptacle is allowed to stand in the position in which it is shown in Fig. 1, and as the vinegar accumulates in the chamber below diaphragm E it is withdrawn through faucet L, all muggy matter being caught by the filtering material F, placed between diaphragms D and E.

From time to time the chamber between diaphragms C and D may be thoroughly cleaned from all impurities collecting therein by removing stoppers G G' and by passing a current of water therethrough by inserting a hose into one bung-hole and by allowing such water to escape through the opposite bung-hole, and also by removing the faucet L and by inserting the hose in the tap-hole thereof, and thus forcing the water through the filtering material F in the direction opposite to that of filtering the vinegar, which water is then to escape through the bung-holes of stoppers G and G'.

It will be readily seen that a vinegar generator and filter thus constructed requires the least manipulation, the several air-ports being automatically opened and closed by reversing the generating-cask, and the filtering material being easily and readily cleaned without taking the apparatus apart.

What I claim is—

In a reversible vinegar-generator balancing on trunnions and in one end thereof, the three perforated diaphragms C, D, and E, with filtering material F, packed between diaphragms D and E, with bung-holes leading from opposing sides into the chamber between diaphragms C and D, and with a faucet reaching into the chamber below diaphragm E, all substantially as set forth, for the purpose specified.

In testimony whereof I affix my signature in presence of two witnesses.

RUDOLPH H. HERDER.

Witnesses:
WILLIAM H. LOTZ,
OTTO LUBKERT.